(12) United States Patent
Choi et al.

(10) Patent No.: US 9,315,611 B2  
(45) Date of Patent: Apr. 19, 2016

(54) POLYURETHANE FOAM AND PNEUMATIC TIRE

(75) Inventors: Seok-Ju Choi, Daejeon (KR); Hak-Joo Kim, Daejeon (KR)

(73) Assignee: HANKOOK TIRE CO., LTD. (KR)

( * ) Notice: Subject to any disclaimer, the term of this patent is extended or adjusted under 35 U.S.C. 154(b) by 923 days.

(21) Appl. No.: 13/298,667

(22) Filed: Nov. 17, 2011

(65) Prior Publication Data

US 2012/0136085 A1  May 31, 2012

(30) Foreign Application Priority Data

Nov. 30, 2010  (KR) .................. 10-2010-0120747

(51) Int. Cl.
| | | |
|---|---|---|
| *C08G 18/40* | (2006.01) | |
| *C08G 18/42* | (2006.01) | |
| *B60C 1/00* | (2006.01) | |
| *C08G 18/18* | (2006.01) | |
| *C08G 18/48* | (2006.01) | |
| *C08G 18/66* | (2006.01) | |
| *C08G 18/76* | (2006.01) | |
| *B60C 19/00* | (2006.01) | |
| *C08G 101/00* | (2006.01) | |

(52) U.S. Cl.
CPC .............. *C08G 18/4018* (2013.01); *B60C 1/00* (2013.01); *B60C 1/0008* (2013.04); *B60C 19/002* (2013.04); *C08G 18/1875* (2013.01); *C08G 18/42* (2013.01); *C08G 18/4277* (2013.01); *C08G 18/4825* (2013.01); *C08G 18/6677* (2013.01); *C08G 18/7671* (2013.01); *C08G 2101/00* (2013.01); *C08G 2101/0008* (2013.01); *C08G 2101/0083* (2013.01); *C08G 2350/00* (2013.01); *C08G 2380/00* (2013.01)

(58) Field of Classification Search
CPC .......... C08G 18/4018; C08G 18/4825; C08G 18/42; C08G 18/4277; C08G 2101/00; C08G 2101/0083; C08G 2350/00; C08G 2380/00; B60C 19/002; B60C 1/00; B60C 1/0008
USPC .................. 521/130, 173; 152/155, 157, 158
See application file for complete search history.

(56) References Cited

U.S. PATENT DOCUMENTS

| | | | | |
|---|---|---|---|---|
| 4,073,858 | A | * | 2/1978 | Chung .................... 264/262 |
| 4,125,660 | A | * | 11/1978 | White et al. ............. 428/218 |
| 4,374,935 | A | | 2/1983 | Decker et al. |
| 4,683,929 | A | * | 8/1987 | Wyman .................... 152/313 |
| 4,980,445 | A | * | 12/1990 | van Der wal et al. ........... 528/76 |
| 5,627,221 | A | | 5/1997 | Schumacher et al. |
| 6,280,815 | B1 | * | 8/2001 | Ersfeld et al. ............... 428/71 |
| 6,316,513 | B1 | * | 11/2001 | McCullough et al. ....... 521/174 |
| 7,750,058 | B2 | * | 7/2010 | Haider et al. ............... 521/174 |
| 2002/0122929 | A1 | * | 9/2002 | Simpson et al. .......... 428/316.6 |
| 2004/0224622 | A1 | * | 11/2004 | Sakurai et al. .............. 451/526 |
| 2008/0076843 | A1 | * | 3/2008 | Clark ........................ 521/137 |
| 2008/0125507 | A1 | * | 5/2008 | Jenny et al. ............... 521/137 |
| 2008/0251186 | A1 | * | 10/2008 | Yukawa et al. ............ 156/123 |
| 2010/0221984 | A1 | * | 9/2010 | Doura et al. ................ 451/41 |

FOREIGN PATENT DOCUMENTS

| | | |
|---|---|---|
| CN | 101654505 A | 2/2010 |
| DE | 10044712 A1 | 3/2002 |
| EP | 0311474 A1 | 4/1989 |
| EP | 1659004 A1 | 5/2006 |
| EP | 1950057 A1 | 7/2008 |
| JP | 09-132629 | 5/1997 |
| JP | 1998-202610 A | 2/2000 |
| JP | 2007-137253 | 6/2007 |
| JP | 2009-218500 A | 9/2009 |

OTHER PUBLICATIONS

European Search Report dated Apr. 10, 2012.

* cited by examiner

*Primary Examiner* — John Cooney

(57) ABSTRACT

A polyurethane foam which is obtained by a reaction between a diol component and a diisocyanate component, with the diol component being a mixture of a polyether-based diol and a polyester-based diol, and a pneumatic tire to which the polyurethane foam is applied are provided. When a soft polyurethane foam is produced using a mixture of a polyether-based diol and a polyester-based diol as the diol component, and by varying the content of the expanding agent during the production process, and when the polyurethane foam is disposed in the cavity of a pneumatic tire, the polyurethane foam thus produced has an effect of reducing the resonance noise generated in the cavity of the tire and improving durability of the tire.

4 Claims, 1 Drawing Sheet

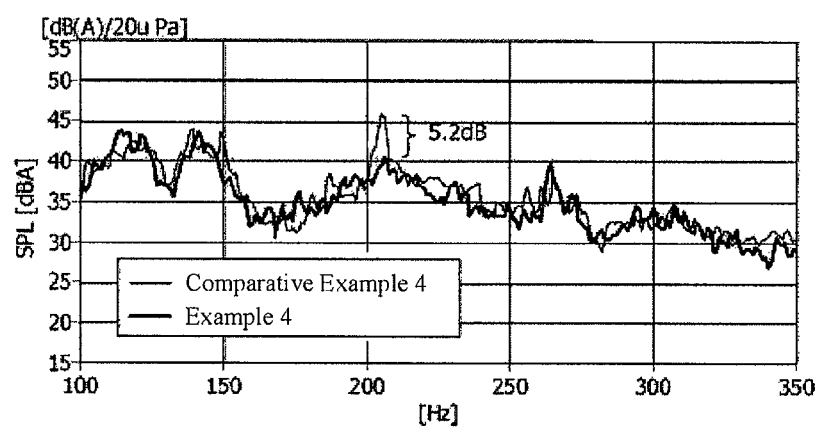

POLYURETHANE FOAM AND PNEUMATIC TIRE

BACKGROUND OF THE INVENTION

1. Field of the Invention

The present invention relates to a polyurethane foam and a pneumatic tire including the same, and more particularly, to a polyurethane foam which can reduce resonance noise generated in the cavity of a pneumatic tire, and a tire produced by applying the polyurethane foam.

2. Description of Related Art

The resonance noise generated in the cavity or the internal space of a tire is an air-borne noise generated in the hollow cavity present inside a tire, and recently, more interest is being paid to an improvement of such noise in the fields of automobile industry and tire industry.

Along with the emergence of electric vehicles, more attempts have been made to improve the driving quality of automobiles. Under such circumstances, there is an increasing demand for reductions in the interior noise as well as the exterior noise attributable to the tire treads, in order to improve the riding comfort and to attain pleasant driving environment.

Among these noises, the noise attributable to the internal space or cavity of a pneumatic tire causes an unpleasant feeling to the driver and deteriorates the driving comfort, because this noise is generated as a sound having sharp peaks in the interior of vehicles.

As electric vehicles that produce very little or no engine room noises have emerged, and the configuration standards for the tires mounted in vehicles have been directed toward less flattening and inch-up, such tire cavity resonance noise is increasingly considered as an important issue.

According to the related art technologies for reducing such tire cavity resonance noise, a special sponge having a sound absorption performance is provided on the inner surface of tires (Korean Patent Application No. 2006-0125502), or the interior space is modified by disposing an annular body that can be mounted over the rims inside a tire and a wheel (Korean Patent Application No. 2005-0102110). In another case, the noise due to the resonance of the tire cavity is reduced by attaching a material such as fur on the surface of the wheel.

However, when a special sponge having a sound absorption performance is provided inside the tire interior, or a foreign material is attached on the wheel surface, additional processes should be added after the production of the tire and the wheel, so that the production cost increases, and the storage of produced tires and wheels may not be as easy as expected. Also, when such a sponge or foreign material is attached over the entire perimeter, the rolling resistance performance (RR performance) may be deteriorated as a result of an increase in weight.

There has been another suggestion that spherical sound absorbing bodies having a diameter of 40 to 100 mm are inserted inside a tire without fixing to the tire wall (Japanese Patent Application No. 2002-240507), so that the sound absorbing bodies can reduce the tire cavity resonance noise. It is considered that such spherical sound absorbing bodies are usefully compliant to the general PCR standards, and adhesion for preventing heat generation is not used. However, since the recent configuration standards for tires are directed toward less flattening, the internal space is narrowed, and accordingly, it may be difficult to apply such spherical sound absorbing bodies. Also, there is still room for improvement in terms of the durability of the sound absorbing bodies.

In view of the material of the sound absorbing bodies, conventional soft foams which are applied to the dashboard unit that separates the engine room and the interior of the vehicle, do not have sufficient sound absorption performance in the low frequency region when used alone. Therefore, there has been an attempt to improve the car sound performance by attaching a thermoplastic material such as a rubber containing a polyolefin as a main ingredient, to a soft foam or the like (Japanese Patent Application Laid-Open No. 5-209036). However, this problem involves another problem of weight increase and the like because it is necessary to consider the adhesiveness of the soft foam and the thermoplastic material. Thus, it has been suggested to improve the sound absorption characteristics in the low frequency region by employing a soft polyurethane foam as the material for the sound absorbing bodies (Korean Patent Application No. 2006-0059957). In this case, a raw material composition containing a high molecular weight polyoxyalkylene polyol, an organic polyisocyanate compound, an expanding agent and a catalyst is used, and this raw material composition is expanded within a closed mold so as to control the air permeability to 0.085 $m^3$/min or less.

Furthermore, a technology for providing a soft polyurethane foam for tires which is mounted on the inner surfaces of a tire by means of a band member, and functions effectively to suppress damage such as cracks, or deformation such as compression (collapse), has also been introduced (Korean Patent Application No. 2008-0070862). However, the performance of this soft polyurethane foam in connection with the reduction of resonance noise in the tires provided with the foam is not considered effective.

Furthermore, according to Korean Patent Publication No. 2010-0047024, in order to attain characteristics such as a soft feeling to touch, a high density, high air permeability, and a high resilience, there is provided a soft polyurethane foam which is obtained by a reaction between a polyol component and a polyisocyanate compound. In this soft polyurethane foam, the polyol component contains a polyol compound, water as an expanding agent, a catalyst, and surfactants, and the polyol compound is a copolymer of propylene oxide and ethylene oxide having an average number of functional groups of 2 to 4. The polyurethane foam is composed of a polyether polyol compound having an ethylene oxide content of 50% to 90% by weight and a hydroxyl group value of 30 to 70 mg KOH/g, and a polymer of propylene oxide and ethylene oxide, and the copolymer occupies 50 to 90 parts by weight relative to 100 parts by weight of the polyol compound.

However, when these conventional soft polyurethane foams are used alone, they do not sufficiently reduce the resonance noise in the low frequency region, and polyurethane foams themselves have low rigidity, so that it has been difficult to overcome problems such as deformation or destruction due to the low rigidity.

SUMMARY OF THE INVENTION

Under such circumstances, the present invention was made to address the problems of the related art as described above, and an object of the present invention is to provide a polyurethane foam which is improved in terms of the general disadvantage that polyurethane foam easily collapses and breaks in the internal cavity of pneumatic tires due to the weak tensile force and low rigidity of the polyurethane foam, and is useful as a sound absorbing material capable of reducing the resonance noise generated in the cavity of pneumatic tires.

Another object of the present invention is to provide a pneumatic tire in which the polyurethane foam described above is applied, so that the resonance noise in the cavity is reduced and excellent riding comfort is obtained.

According to an aspect of the present invention, there is provided a polyurethane foam obtainable through a reaction of a composition for forming the polyurethane foam comprising a diol component and a diisocyanate component, wherein the diol component is a mixture of a polyether-based diol and a polyester-based diol.

The polyester-based diol may be contained in an amount of 5 to 30 parts by weight relative to 100 parts by weight of the total amount of the diol component, and the polyether-based diol may be contained in an amount of 70 to 95 parts by weight relative to 100 parts by weight of the total amount of the diol component.

The polyether-based diol may have a hydroxyl group value of 22 to 36 mg KOH/g, and a weight average molecular weight of 2,000 to 3,500 g/mol.

The polyether-based diol may be polypropylene oxide.

The polyester-based diol may have a hydroxyl group value of 260 to 325 mg KOH/g.

The polyester-based diol may be one selected from the group consisting of a polycaprolactone diol, a polyester diol, a polyester polycarbonate diol, a polycarbonate diol, a polycarbonic acid ester diol and combinations thereof.

The composition for forming the polyurethane foam may further contain one selected from the group consisting of a chemical expanding agent, a catalyst, a crosslinking agent and combinations thereof.

The chemical expanding agent may be water, and may be incorporated in an amount of 1.10 to 1.50 parts by weight relative to 100 parts by weight of the total amount of the diol component.

According to another aspect of the present invention, there is provided a pneumatic tire including the polyurethane foam described above.

According to the embodiments of the present invention, when a soft polyurethane foam produced by using a mixture of a polyether-based diol and a polyester-based diol as a diol component in the production of the polyurethane foam, and by varying the content of the expanding agent, is disposed in the cavity of a pneumatic tire, the resonance noise generated in the tire cavity can be reduced, and an effect of improving durability can be obtained.

BRIEF DESCRIPTION OF THE DRAWINGS

FIG. 1 is a diagram showing the results of an analysis of the noise characteristics of Example 4 and Comparative Example 4.

DETAILED DESCRIPTION OF THE INVENTION

Hereinafter, the present invention will be described in more detail.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof.

The polyurethane foam according to an embodiment of the present invention is formed by using a composition for forming the polyurethane foam. The polyurethane foam is produced by utilizing a process for producing polyurethane through a reaction between a diol component and a diisocyanate component. The composition for forming the polyurethane foam may comprise the diol component, the diisocyanate component, and one selected from the group consisting of a chemical expanding agent, a catalyst, a crosslinking agent and combinations thereof.

The diol component used in the present invention is a mixture of a polyether-based diol and a polyester-based diol. It is intended, through the use of such a mixture, to appropriately utilize the advantages of a polyether-based diol and the advantages of a polyester-based diol so as to obtain a polyurethane foam which is improved in terms of the tendency that polyurethane foams easily collapse or break as in the case of sponge, due to the weak tensile force of conventional polyether-based polyurethane foams, and to thereby reduce the resonance noise generated in the cavity of a pneumatic tire.

The polyester-based diol is a polymer having an ester bond within the molecule and having hydroxyl groups at the ends of the molecular chain. Specific examples thereof include a polycaprolactone diol, a polyester diol, a polyester polycarbonate diol, a polycarbonate diol, and a polycarbonic acid ester diol, and among these, a polycaprolactone diol is most preferred.

The polyester-based diol may be obtained by a known method, such as a direct esterification reaction or a transesterification reaction, between a polycarboxylic acid or a derivative thereof capable of forming an ester, such as an ester or an anhydride, and a diol compound.

The polyester-based diol may have a hydroxyl group value of 260 to 325 mg KOH/g. When the hydroxyl group value of the polyester-based diol is smaller or lager than this range, there may be a problem in securing an appropriate molecular weight and exhibiting the desired properties of the foam.

The polyether-based diol described above has excellent flexibility, feels soft to touch, and does not exhibit high moisture absorbing properties. Thus, when a polyurethane foam is produced using this polyether-based diol, and the foam is applied to tires, there is obtained an advantage that long-term storage of tires is facilitated. Therefore, according to the present invention, it is intended to produce a polyurethane foam having both flexibility and rigidity by using a highly flexible polyether-based diol as a principal component.

The polyether-based diol according to the embodiment of the present invention preferably has a hydroxyl group value of 22 to 36 mg KOH/g. When the hydroxyl group value of the polyether-based diol is smaller or larger than this range, there may be a problem in securing an appropriate molecular weight and exhibiting the desired properties of the foam.

The weight average molecular weight of the polyether-based diol is preferably 2,000 to 3,500 g/mol, and when the weight average molecular weight of the polyether-based diol is smaller or larger than this range, there may be a problem in acquiring the desired flexibility of the polyurethane foam.

The polyether-based diol may be contained in an amount of 70 to 95 parts by weight relative to 100 parts by weight of the total amount of the diol component, and it is preferable to use a polyester-based diol for the remaining portion. When the content of the polyether-based diol is smaller or greater than 70 to 95 parts by weight, the desired properties of the polyurethane foam, such as flexibility, may not be obtained.

A preferable example of the polyether-based diol that can satisfy the conditions and characteristics may be polypropylene oxide.

There are no particular limitations on the type of the diisocyanate component to react with the diol component, and any aliphatic, alicyclic or aromatic organic diisocyanate compound that is usually used in the production of urethane may all be used. Specific examples of such a diisocyanate compound include, but are not limited to, methylene diphenyl diisocyanate (MDI), 4,4'-diphenylmethane diisocyanate, p-phenylene diisocyanate, xylene diisocyanate, hexamethylene diisocyanate, isophorone diisocyanate, tolylene diisocyanate, 1,5-naphthalene diisocyanate, and 4,4'-dicyclohexylmethane diisocyanate.

During the production of the polyurethane of the present invention, the diol component and the diisocyanate component may be made to react at a weight ratio of 100:20 to 100:35.

Furthermore, according to the embodiment of the present invention, when polyurethane is synthesized from the diol component and the diisocyanate component described above, and the polyurethane is expanded, one selected from the group consisting of a chemical expanding agent, a catalyst, a crosslinking agent and combinations thereof may be used.

The chemical expanding agent is preferably water, and water may be incorporated in an mount of 1.10 to 1.50 parts by weight relative to 100 parts by weight of the diol component. Since the final properties of the polyurethane foam according to the present invention can be regulated by adjusting the content of water, which is an expanding agent, if the content of water as the expanding agent is less than 1.10 parts by weight relative to 100 parts by weight of the diol component, the foam may not be stably formed. If the content of water is greater than 1.50 parts by weight relative to 100 parts by weight of the diol component, flexibility of the foam may be decreased due to an increase in the production of polyurea.

Furthermore, as the catalyst to be used in the production of the polyurethane foam, one selected from amine-based catalysts, tin-based catalysts and combination thereof may be used, but the present invention is not intended to be limited thereto.

As the crosslinking agent to be used in the production of the polyurethane foam, one selected from diol-based crosslinking agents, diamine-based crosslinking agents and combinations thereof may be used, but the present invention is not intended to be limited thereto.

Furthermore, in addition to the catalyst and crosslinking agent described above, the polyurethane foam according to the present invention can be produced by further incorporating other additives that are generally used in the production of polyurethane foams, such as a surfactant and a flame retardant.

The polyurethane foam of the present invention can be produced by mixing the diol component, the diisocyanate component, water as an expanding agent, a catalyst, a crosslinking agent, and other additives. There are no particular limitations on the production conditions for the polyurethane foam according to the present invention, and the conventional conditions for the production of polyurethane foam can be applied.

The polyurethane foam produced according to the embodiment of the present invention may satisfy the requirements of a 25% indentation load deflection (25% ILD) value of 25 to 40, and a hardness decrease rate (durability) of 2 to 5. These properties can be regulated by regulating the diol component used in the invention, and varying the content of the expanding agent. It is speculated that these properties offer an improvement in terms of the disadvantage that polyurethane foam collapses or breaks inside the cavity of a pneumatic tire, and work effectively to reduce the resonance noise.

According to another embodiment of the present invention, there is provided a pneumatic tire including the polyurethane foam according to the present invention inside the tire.

The polyurethane foam may be applied to the pneumatic tire in a manner such that pieces, preferably cylindrical pieces, of the polyurethane foam may be filled in the internal cavity of the pneumatic tire, or the polyurethane foam may be sprayed on the inner wall of the pneumatic tire. However, the present invention is not intended to be limited to these methods.

The pneumatic tire of the present invention including this polyurethane foam can have the resonance noise in the low frequency region decreased to 0 dB to 10 dB, irrespective of the circumference of the tire. Therefore, the pneumatic tire has an effect of solving the problem of decreased riding comfort due to the resonance noise generated in the cavity of the tire.

Hereinafter, the present invention will be described in more detail by way of Examples. The following Examples of the present invention are provided so as to explain the present invention more completely to those having ordinary skill in the art, and the Examples may be presented in the form of various modifications and alterations. Therefore, the present invention is not intended to be limited to the following Examples. Rather, the following Examples are provided in order to best explain the principles of the invention and the practical application, and to enable those having ordinary skill in the art to more fully understand the idea and concept of the invention.

Examples 1 to 3 and Comparative Examples 1 to 3

The components of each of the compositions indicated in the following Table 1 were introduced into a chamber, and were mixed under stirring. Thus, a polyurethane foam was produced.

TABLE 1

| Content (parts by weight) | | Comparative Example | | | Example | | |
|---|---|---|---|---|---|---|---|
| | | 1 | 2 | 3 | 1 | 2 | 3 |
| Polyol component | Polyether diol (polypropylene oxide, 36 mgKOH/g) (Molecular weight) | 100 (2000) | 100 (3000) | 100 (>3500) | 90 (2000) | 90 (3000) | 90 (>3500) |
| | Polyester diol (polycaprolactone | — | — | — | 10 | 10 | 10 |

TABLE 1-continued

| Content (parts by weight) | Comparative Example | | | Example | | |
|---|---|---|---|---|---|---|
| | 1 | 2 | 3 | 1 | 2 | 3 |
| diol, 280 mgKOH/g) | | | | | | |
| Diisocyanate MDI component | 23.53 | 30.58 | 34.81 | 23.53 | 30.58 | 34.81 |
| Expanding agent (water) | 1.10 | 1.10 | 1.10 | 1.35 | 1.35 | 1.35 |
| Catalyst (quaternary ammonium-based) | 2.0 | 2.0 | 2.0 | 2.0 | 2.0 | 2.0 |
| Crosslinking agent (glycerin) | 2.3 | 2.3 | 2.3 | 2.3 | 2.3 | 2.3 |
| Other additives (colorant, age inhibitor, flame retardant, etc.) | 9.0 | 9.0 | 9.0 | 9.0 | 9.0 | 9.0 |

Experiment Example 1

The hardness decrease rate and the 25% ILD of the various polyurethane foams produced in the Examples 1 to 3 and Comparative Examples 1 to 3 were measured in the following manner. The results are presented in the following Table 2.

25% ILD: A polyurethane foam specimen having a thickness of 50 mm was pressed up to 75% with a circular pressing plate having a predetermined size, at a predetermined rate, and then the load was removed. The polyurethane foam specimen was pressed again up to 25%, and the load after 20 seconds was measured as a hardness value.

Hardness decrease rate: The relative decrease in hardness was calculated from the results obtained as described above.

TABLE 2

| | Comparative Example 1 | Comparative Example 2 | Comparative Example 3 | Example 1 | Example 2 | Example 3 |
|---|---|---|---|---|---|---|
| Hardness decrease rate (Durability) | 9.1 | 7.3 | 5.6 | 5.0 | 2.3 | 2.1 |
| 25% ILD | 19 | 21 | 22 | 40 | 35 | 28 |

It can be seen from the results of Table 2 that the polyurethane foams produced in Examples 1 to 3 of the present invention have improved durability and hardness, as compared with the polyurethane foams according to Comparative Examples 1 to 3.

Examples 4 to 6 and Comparative Examples 4 to 6

The respective polyurethane foams produced in the Examples 1 to 3 and Comparative Examples 1 to 3 were produced into a cylindrical form, and the cylindrical pieces of each of the polyurethane foams were filled in the cavity of a pneumatic tire.

Experimental Example 2

The noise characteristics of the respective pneumatic tires produced according to Example 4 and Comparative Example 4 were analyzed in the following manner. The results are presented in FIG. 1.

Analysis of noise characteristics: The analysis was made by a method of measuring the noise from the driver's seat during a performance verification test.

As can be seen from FIG. 1, when the polyurethane foam according to the present invention was applied to a pneumatic tire, and it was evaluated whether an improvement was made on the resonance noise, it was found that an effect of improvement was obtained on the reduction of the resonance noise by 5.2 dB at 210 Hz, which is in the low frequency region.

Experiment Example 3

The adhesive strength of each of the pneumatic tires produced in the Examples 4 to 6 and Comparative Examples 4 to 6 was measured in the following manner. The results are presented in Table 3.

Adhesive strength: The adhesive strength was measured six times using a tack tester, and then the average adhesive force was calculated.

TABLE 3

| | Comparative Example 4 | Comparative Example 5 | Comparative Example 6 | Example 4 | Example 5 | Example 6 |
|---|---|---|---|---|---|---|
| Adhesive strength (kgf) | 6 | 5 | 7 | 5 | 9 | 10 |

It can be seen from Table 3 that when the polyurethane foams according to the present invention were applied to pneumatic tires, the adhesive strength was enhanced.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A pneumatic tire including a polyurethane foam in its internal cavity wherein the polyurethane foam is obtained by using a composition for forming the polyurethane foam comprising a diol component and a diisocyanate component, wherein the diol component is a mixture of a polyether-based diol and a polyester-based diol,
wherein the polyether-based diol is polypropylene oxide and the polyester-based diol is polycaprolactone;
wherein the polyester-based diol has a hydroxyl group value of 260 to 325 mg KOH/g.

2. The pneumatic tire according to claim 1, wherein the polyester-based diol is contained in an amount of 5 to 30 parts by weight relative to 100 parts by weight of the total amount of the diol component, and the polyether-based diol is contained in an amount of 70 to 95 parts by weight relative to 100 parts by weight of the total amount of the diol component.

3. The pneumatic tire according to claim 1, wherein the composition for forming the polyurethane foam further comprising one selected from the group consisting of a chemical expanding agent, a catalyst, a crosslinking agent and combinations thereof.

4. The pneumatic tire according to claim 3, wherein the chemical expanding agent is water and is incorporated in an amount of 1.10 to 1.50 parts by weight relative to 100 parts by weight of the total amount of the diol component.

\* \* \* \* \*